US005505035A

United States Patent [19]
Lalvani

[11] Patent Number: 5,505,035
[45] Date of Patent: Apr. 9, 1996

[54] BUILDING SYSTEMS WITH NON-REGULAR POLYHEDRAL NODES

[76] Inventor: Haresh Lalvani, 164 Bank St., Apt 2B, New York, N.Y. 10014

[21] Appl. No.: 903,572

[22] Filed: Jun. 24, 1992

[51] Int. Cl.⁶ .................................................. E04B 1/18
[52] U.S. Cl. .................. 52/648.1; 52/311.2; 52/653.1; 52/DIG. 10
[58] Field of Search .................. 52/648.1, 653.1, 52/653.2, 311.2, DIG. 10

[56] References Cited

U.S. PATENT DOCUMENTS

| | | | |
|---|---|---|---|
| 3,970,301 | 7/1976 | Lehmann | 52/648.1 |
| 4,723,382 | 2/1988 | Lalvani | 52/648.1 |
| 5,007,220 | 4/1991 | Lalvani | 52/648.1 |

*Primary Examiner*—Carl D. Friedman
*Assistant Examiner*—Christopher Todd Kent

[57] ABSTRACT

A family of space frame systems composed of a plurality of nodes coupled by struts and derived from a family of non-regular polyhedra by joining the center of these polyhedra to their faces, edges and vertices. The space frames permit periodic, non-periodic, random and irregular building configurations. The building system can be combined with panels, tensile and membranes systems, or can be converted into plate systems or nodeless space frame systems. The spaces and configurations defined by the building system include single-layered, double-layered, multi-layered configurations, non-layered and multi-directional configurations, polyhedral packings and space-fillings, infinite polyhedra, and various 3-dimensional projections of n-dimensional polytopes for architectural environments. The n-dimensional polytopes include the infinite classes of hyper-cubes and hyper-cubic lattices, and a variety of 4-dimensional polytopes.

Applications include architecture on earth and in space, environmental and sculptural structures, platforms, roofs and playground structures, honeycombs, toys, games and educational kits.

17 Claims, 9 Drawing Sheets

BUILDING SYSTEMS WITH NON-REGULAR POLYHEDRAL NODES

This application is related to the application entitled "Building Systems with Non-Regular Polyhedra Based on Subdivisions of Zonohedra", Ser. No. 07/740,504 dated Aug. 5, 1991 which is a CIP of a Division of Ser. No. 07/428,018 dated Oct. 26, 1989 (U.S. Pat. No. 5,036,635), which is a Continuation of Ser. No. 07/319,861 dated Mar. 6, 1989 which is a Continuation of Ser. No. 07/088,308 dated Aug. 24, 1987 (Abandoned).

FIELD OF INVENTION

This invention related to periodic, non-periodic, random arid irregular building configurations composed of a plurality of non-regular nodes coupled by struts. The nodes are defined by classes of non-regular polyhedra which determine the number and angles of directions of struts by lines joining their center to their vertices, edges and faces. The building system can be combined with panels, tensile and membranes systems, or can be converted into plate systems. The spaces and configurations defined by the building system include layered and non-layered configurations, polyhedral packings and space-fillings, infinite polyhedra, and various n-dimensional polytopes for architectural environments.

BACKGROUND OF THE INVENTION

Building systems composed of industrialized manufactured parts ususlaly rely upon well-known geometries where the shapes of the components are designed according to the geometry dictated by the underlying spatial grids. Such underlying grids have usually been periodic in nature, though some recent proposals have included non-periodic geometries. Examples of such building systems include: Fuller's octet truss composed of regular octahedra and tetrahedra and already anticipated by Alexander Graham Bell, Pearce's Mini-max system based on the twenty-six strut directions determined by the thirteen symmetry axes of a regular cube, NASA's node for the Space Station, also based on the twenty-six directions of the regular cube, the Mero system based on the eighteen directions of the regular cube, Baer's 31-zome system based on the thirty-one axes of symmetry of the regular icosahedron, and Lalvani's systems based on the various directions of the infinite classes of regular prisms.

Numerous patents have been cited in this field and include: U.S. Pat. No. 1,113,371 to Pajeau; U.S. Pat. No. 1,960,328 to Breines; U.S. Pat. No. 2,909,867 to Hobson; U.S. Pat. No. 2,936,530 to Bowen; U.S. Pat. No. 3,563,581 to Sommerstein, U.S. Pat. No. 3,600,825 to Pearce; U.S. Pat. No. 3,632,147 to Finger; U.S. Pat. No. 3,722,153 to Baer; U.S. Pat. No. 3,733,762 to Pardo; U.S. Pat. No. 3,918,233 to Simpson; U.S. Pat. No. 4,113,256 to Hutchings; U.S. Pat. No. 4,129,975 to Gabriel, U.S. Pat. No. 4,133,152 to Penrose; U.S. Pat. No. 4,183,190 to Bance; U.S. Pat. No. 4,295,307 to Jensen; U.S. Pat. No. 4,620,998 to Lalvani; U.S. Pat. No. 4,679,961 to Stewart; U.S. Pat. No 4,723,382 to Lalvani; U.S. Pat. No. 5,007,220 to Lalvani and U.S. Pat. No. 5,036,635 to Lalvani. Related foreign patents include U.K. patents 1,283,025 to Furnell and 2,159,229A to Paton; West German patent 2,305,330 to A. Cilveti and 2,461,203 to Aulbur; French patents 682,854 to Doornbos et al and 1,391,973 to Stora; and Italian patent 581,277 to Industria Officine Magliana. The disclosure of these patents are hereby incorporated herein by reference.

All modular periodic and non-periodic building space frame systems in prior art are based on regular (Platonic), semi-regular (Archimedean) polyhedra and regular prisms. These restrictions though necessary from certain formal aspects of symmetry and modularity, are limiting for an architect from the point of view of flexibility in designing irregular, one-of-a-kind compositions for individual projects and clients. Compared with systems based on regular polyhedra, where at most three different lengths of struts are used, non-regular modular building systems, like the ones disclosed herein, use a greater variety of lengths and regular or arbitrary angles. There are no building systems based on nodes derived from non-regular polyhedra in prior art. The co-pending application 07/740,504 deals with non-regular polyhedra derived from various vector-stars, wherein the vector-stars are used as a geometric generators but not as physical building elements. In the present disclosure, the vector-stars are used as physical nodes of a building system.

The use of non-regular nodes, as described herein, permits a greater flexibility in design and architectural layout by allowing the possibility of making a variety of periodic configurations, a variety of non-periodic configurations, and a variety of arbitrary and random configurations from fixed number of building parts. Such a flexibility is greatly desirable for an architect, since the same system can allow each architect to develop his or her own designs in an endless variety of ways. In addition, non-regular space frame nodes permit a modular randomness which is a desirable goal in architectural design. The "modular" aspect is neccessary for economy in technological production, manufacture and assembly in both traditional and computer-aided design and manufacturing environments. The "randomness" aspect in design is important since it permits the designer to break the order locally and globally within a system and produce irregular compositions.

The search for novelty in design leads the designer to look for new ways to configure and structure spaces within architectural contexts. Building systems based on non-regular polyhedral nodes expand the architectural vocabulary by providing structures with irregular angles, lengths and faces. Such structures, while retaining the property of permitting periodic configurations, permit non-periodic configurations, and further permit irregular-random configurations out of a limited number of building components, thereby advancing the building art.

SUMMARY OF THE INVENTION

Accordingly, the primary object of the invention is to provide a family of building systems comprsing space frames based on classes of non-regular polyhedral nodes connected by appropriate struts, where the space frames can be converted into panel or plate systems, nodeless space frames, membrane and shell systems, tensile and tensegrity systems, and various architectural design and construction kits.

Another object of the invention is to permit the design of a variety of periodic, non-periodic and irregular random-looking spatial configurations from a limited set of component parts.

Another object of the invention is to permit the construction of a variety of non-regular building systems which are topologically identical to the building currently in use (like the Pearce's 13-directional cubic node system, and Baer's 31-directional icosahedral node system) but are geometrically different.

Another object of the invention is to permit the construction of a variety of 3-dimensional projection of n-dimensional polytopes including the hyper-cube, hyper-cubic lattices, and various 4-dimensional polytopes.

The foregoing objects are basically achieved by providing a class of building space frame systems derived from the number and angles of directions specified by several classes of non-regular polyhedra. These classes of non-regular polyhedra include the following:

a. hexahedra, parallelopipeds and rhombohedra, b. infinite class of upright and tilted p-sided non-regular prisms with unequal sides and uneqaul angles where p is greater than 2, c. non-regular tetrahedra, d. non-regular octahedra, e. non-regular icosahedra, f. non-regular dodecahedra, g. any non-regular variant of the thirteen Archimedean semi-regular polyhedra or their duals, and h. any arbitrary convex or non-convex polyhedron.

From this class of non-regular polyhedra, lines joining the vertices, any points on the edges, any points of the faces, prescribe the directions of the struts for the space frames. The angles between these directions prescribe the face angles of the non-regular polygons comprising the derived polyhedra. The lengths of these lines determine the lengths of the struts or edges of the derived polyhedra.

Other objects, advantages and salient features of the invention would become clearer from the following detailed description, which, taken in conjunction with the annexed drawings, discloses preferred embodiments of the present invention.

DRAWINGS

Referring to the drawings which form a part of this original disclosure.

DETAILED DESCRIPTION OF THE INVENTION

This invention is based on the use of nodes, or node-stars, derived by joining the center of various non-regular polyhedra to its faces, edges and vertices. A variety of non-regular polyhedra, which can be seen as geometric variants of the known regular and semi-regular polyhedra, are described along with the derivation of associated node-stars. Node-stars, as used herein, is a term used for the configuration of struts attached to and radiating from a central node. The definition of "nodes" herein is meant to imply a physical node in a space frame, or a node-complex derived from the star-geometry of the nodes. The node-complex may also include a "nodeless" system, where no physical node is present, but where the directions of the struts are determined by the directions specfied by the node-star.

Regular polyhedra, also termed "Platonic solids" and well-known in the literature, are defined as polyhedra composed of regular polygons having equal face angles and equal edge lengths, where the regular polyhedra meeting identically at every vertex. There are five such polyhedra which include the tetrahedron composed of four equilateral triangles with three triangles meeting at every vertex, octahedron composed of eight equilateral triangles with four triangles meeting at every vertex, cube composed of six squares with three squares meeting at every vertex, icosahedron composed of twenty equilateral triangles with five triangles meeting at every vertex and the dodecahedron composed of twelve regular pentagons with three pentagons meeting at every vertex.

Non-regular polyhedra are here defined as polyhedra composed of non-regular polygonal faces. Non-regular polygons have at least two different face angles, and may have equal or unequal edges. This includes the odd-sided plane polygons and the infinite class of even-sided plane polygons called zonogons. In addition, non-regular polygons may be convex where all face angles are less than 180°, or concave where at least one angle is greater than 180°. Non-regular polygons may also be planar or non-planar, like saddle-shaped polygons.

Non-regular polyhedra composed of only triangles, as in the case of non-regular tetrahedra, octahedra and icosahedra, have at least two different edge lengths. However, in these three cases, the faces remain planar. The non-regular tetrahedra are always convex, while the non-regular octahedra and icosahedra can be convex or concave.

Non-regular variant of a cube includes the general class of hexahedra composed of six planar or non-planar quadrilaterals. Restricting to planar faces, the general class of parallelopipeds is composed of three pairs of parallelograms and three sets of unequal edges. When the three sets of edges are equal, the parallelopipeds are rhombohedra. When two sets of edges are equal, the parallelopipeds are upright or tilted rhombic prisms. The faces of various parallelopipeds are composed of squares, rectangles, rhombii and parallelograms.

Non-regular pentagonal dodecahedra are compsed of non-regular pentagons. When the pentagons are planar, at least two different edges are necessary. When the pentagons are non-planar, all its edges may be equal or unequal.

Other classes of well-known regular-faced polyhedra include the thirteen semi-regular Archimedean polyhedra composed of more than one type of regular polygon. Here too, the polygons meet alike at all the vertices. Non-regular variants of Archimedean polyhedra include polyhedra composed of the same number of faces and meeting alike in the same manner at the vertices, as in the case of Archimedean polyhedra, but here the faces are non-regular polygons.

One more class of regular-faced polyhedra includes the infinite class of prisms. The non-regular counterparts are composed of non-regular top and bottom faces connected by square, rectangular or parallelogram faces. Other non-regular variants of prisms include saddle prisms with a saddle top and bottom. Non-regular pyramids can be seen as derivatives of prisms, or a separate class by themselves.

All the above-mentioned non-regular polyhedra are used as a basis for the derivation of nodes for space frames. The polyhedra are converted into node-stars by joining their centers to various positions on the surface of the polyhedra. In practice, the precise geometry of the non-regular polyhedra, with appropriate edge-lengths and face angles must be specified. From these the directions of struts radiating from the center can be easily calculated by trignometry. Other examples of non-regular node-stars are derived from arbitrary convex or non-convex polyhedra and vector-stars. The vector stars are usually used as a geometric device to generate zonohedra, n-dimensional cubes, and space-fillings of rhombohedra and zonohedra. Here these stars are used as a physical node for architectural space frames.

Figure 1:
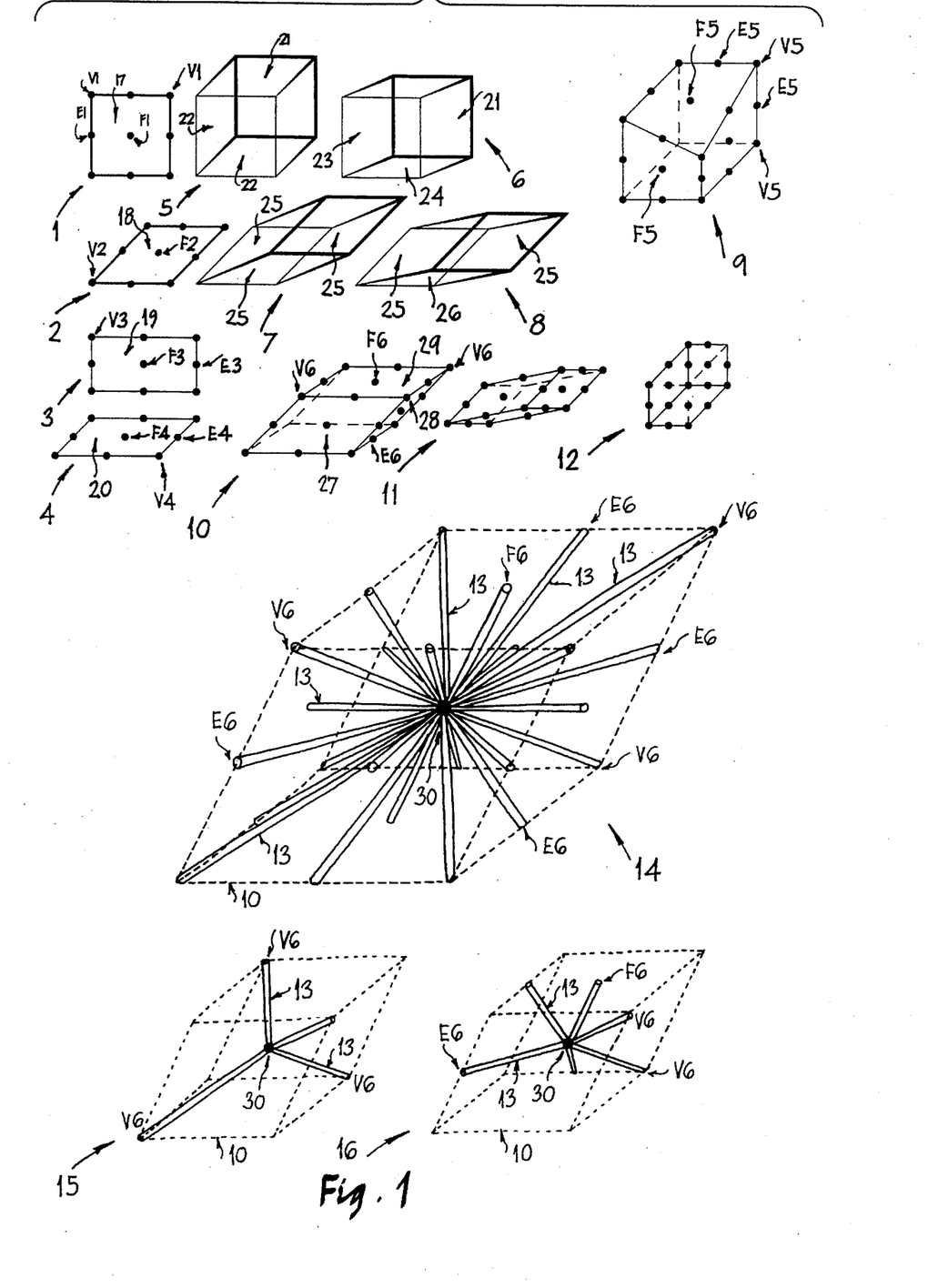
FIG. 1 shows various types of non-regular hexahedra including parallelopipeds and rhombohedra and their associated node-stars. THis includes a 26-strut (13-directional) node-star for a space frame system is also shown.

FIG. 1 shows a variety of hexahedra including various rhomohedra and parallelopipeds and the derivation of node-stars from such a family of non-regular polyhedra. Illustrations 1–4 show the top plan view of four upright prisms: square prism 1 composed of faces 17, a rhombic prism 2 with a top face 18, a rectangular prism 3 with a top face 19, and a parallelopiped 4 with a parallelogram face 20 on top and bottom. In the four cases, the vertex-locations are marked V1–4, the points on the edges are marked E1–4, and the points on the faces are marked F1–4. These are the points on the surface of the parallelopiped which will be joined to the center to derive a node-star. Miscellaneous other examples of parallelopipeds are shown. The rhombohedron 5 is composed of a top square face 21 and two equal rhombic faces 22, the rhombohedron 6 is composed of top square face 21 and two different rhombic faces 23 and 24, a rhombohedron 7 is composed of three equal rhombic faces 25, and the rhombohedron 8 is composed of two different rhombic faces 25 and 26.

The hexahedron 9 is composed of six saddle quadrilaterals with the vertex points marked V5, the edge points marked E5 and the face points marked F5. The rhombohedron 10 is similarly marked with its vertex points V6, edge points E6 and face points F6, and is composed of three different faces 27, 28 and 29. Parallelopipeds 11 and 12 have unequal edges and its surface points are similarly shown by black dots.

The node-star 14 is based on the rhombohedron 10. It has all the directions of struts 13 shown emanating from the node 30 in its center. There are eight struts joining the central node to the vertices V6, six struts joining to the face points F6 and twelve struts joining to the edge points E6. This makes a total of twenty-six struts emanating from the node. Note that this node has the same number of directions as the full cubic-symmetry node used by Pearce, and will permit topologically identical to but geometrically different from the configurations derived from the Pearce node.

The node-star 15 is a sub-set of the node-star 14 and is composed of only four struts 13 joining the central node to the vertex points V6. In the node-star 16, a combination of vertex-, edge- and face- points are joined by struts 13 to the central node 30 to suggest the possibility of using a sub-set of the full node-star 14.

Figure 2:
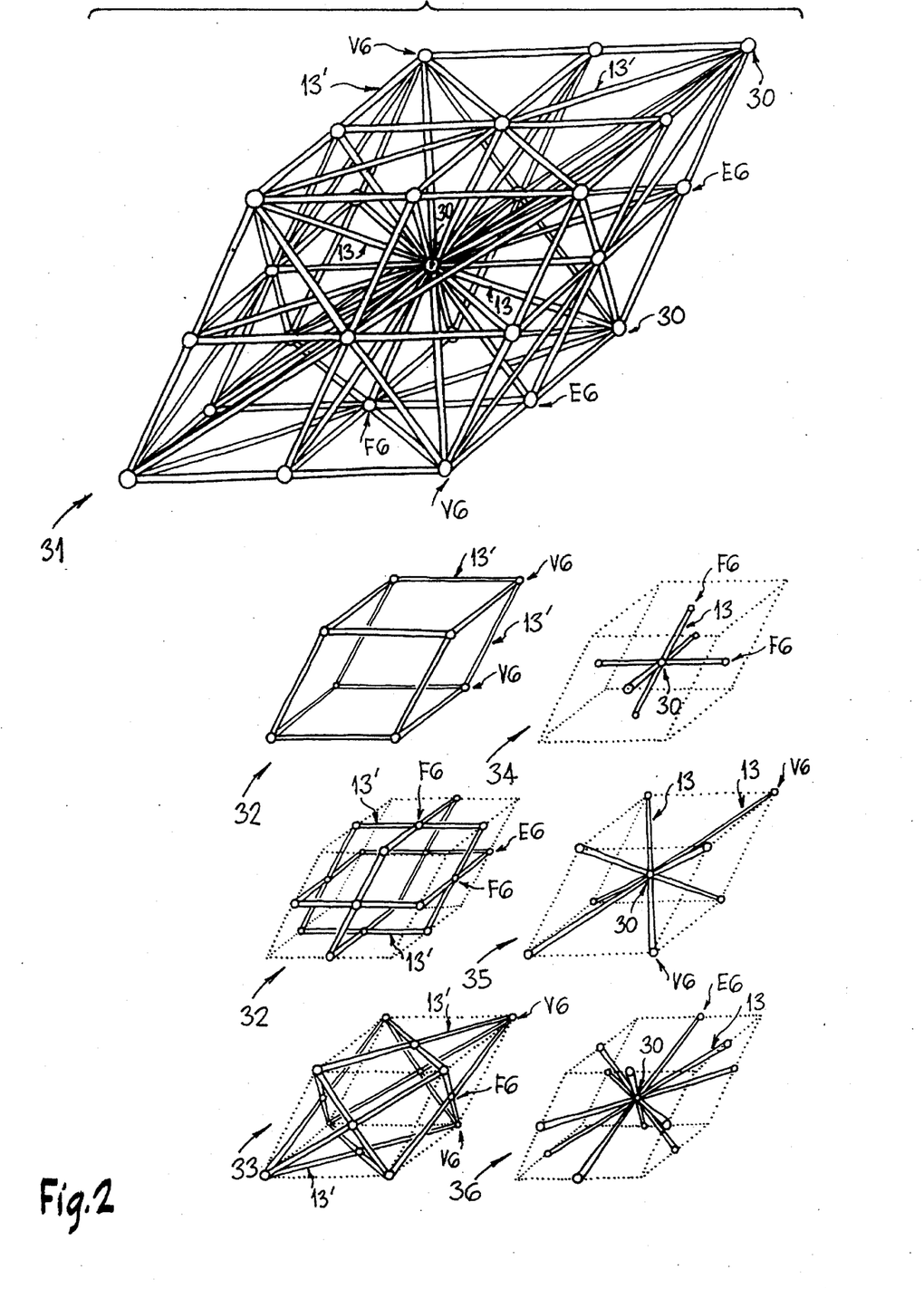
FIG. 2 shows a unit portion of a space frame based on the 26-strut (13-directional) node-star obtained from a rhombohedron. Various derivative units for space frames are also shown.

In FIG. 2, the entire rhombohedral space frame complex 31 is completed by joining the outer points, now replaced by additional nodes 30, by adding new struts 13' on the periphery. This illustrates the concept of repeating the node in a space frame. Various decompositions of the space frame complex 31 are shown in 32–36. In frame 31, the points V6, now replaced by node 30, are joined to one another by struts 13'. In frame 32, points F6 to E6 are joined by struts 13'. In frame 33, points F6 are joined to points V6 by struts 13'. In frame 34, face points F6 are joined to the center node 30 by struts 13, in frame 35, the vertex points V6 are joined to node 30, and in frame 36, the edge points E6 are joined to the center.

Figure 3:
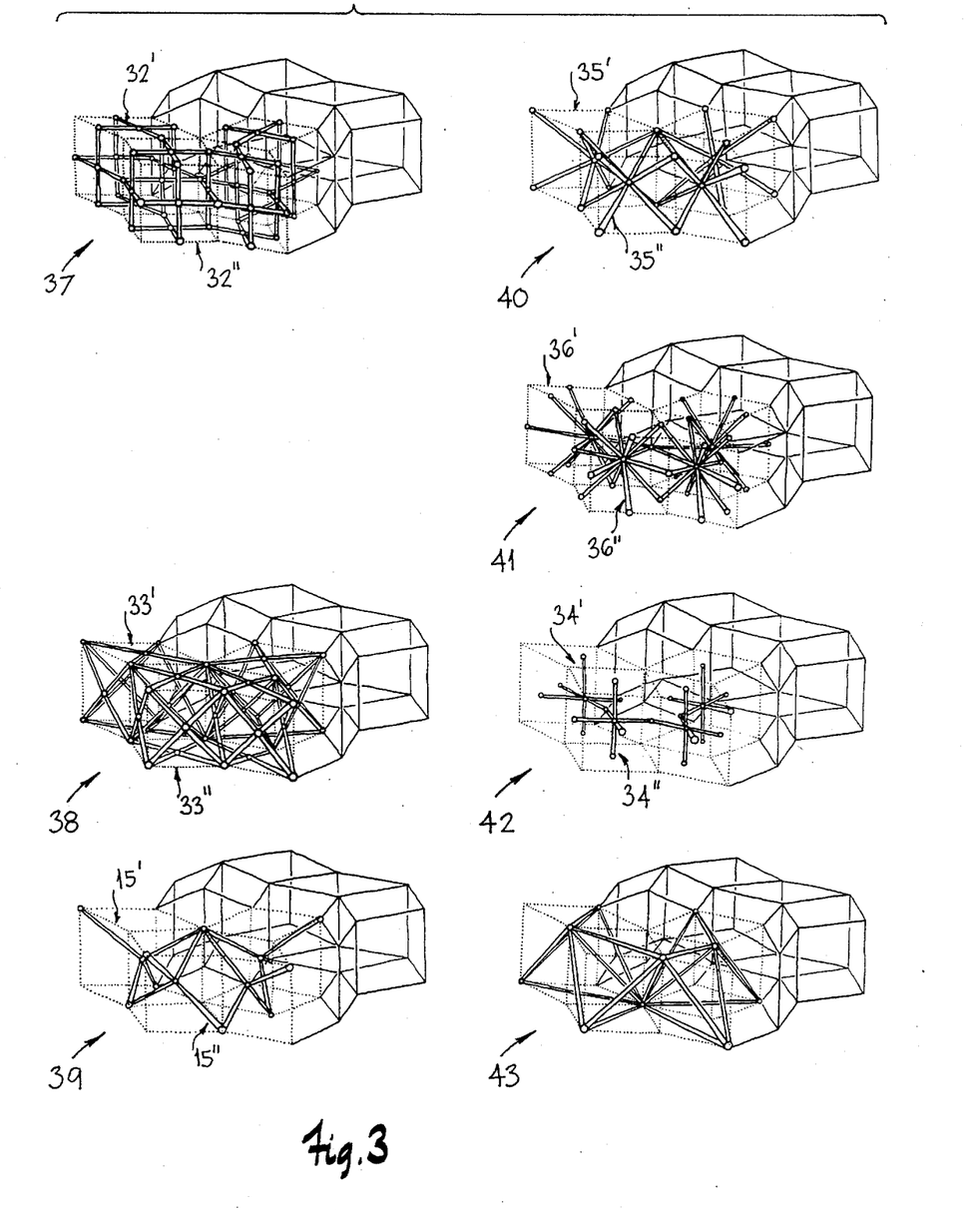
FIG. 3 shows portions of non-periodic space frame arrangements using the the concepts space frames units derived in FIG. 2.

The frames 32–36 can now be used as sub-assembly units to generate larger periodic, non-periodic or random configurations. This is shown in FIG. 3 with a portion of a non-periodic space-filling composed of rhombohedra. In the space frame 37, the unit sub-assembly 32 is applied to adjacent rhombohedra as shown with the units 32' and 32". Similarly, the space frame 38 is composed of units 33' and 33" corresponding to the unit 33 in FIG. 2, space frames 40, 41 and 42 correspond to the units 35, 36 and 34, respectively. The space frame 39 corresponds to the unit 15 in FIG. 1, and space frame 43 is obtained by joining alternate vertices of a rhombohedron or a parallelopiped.

Figure 4:
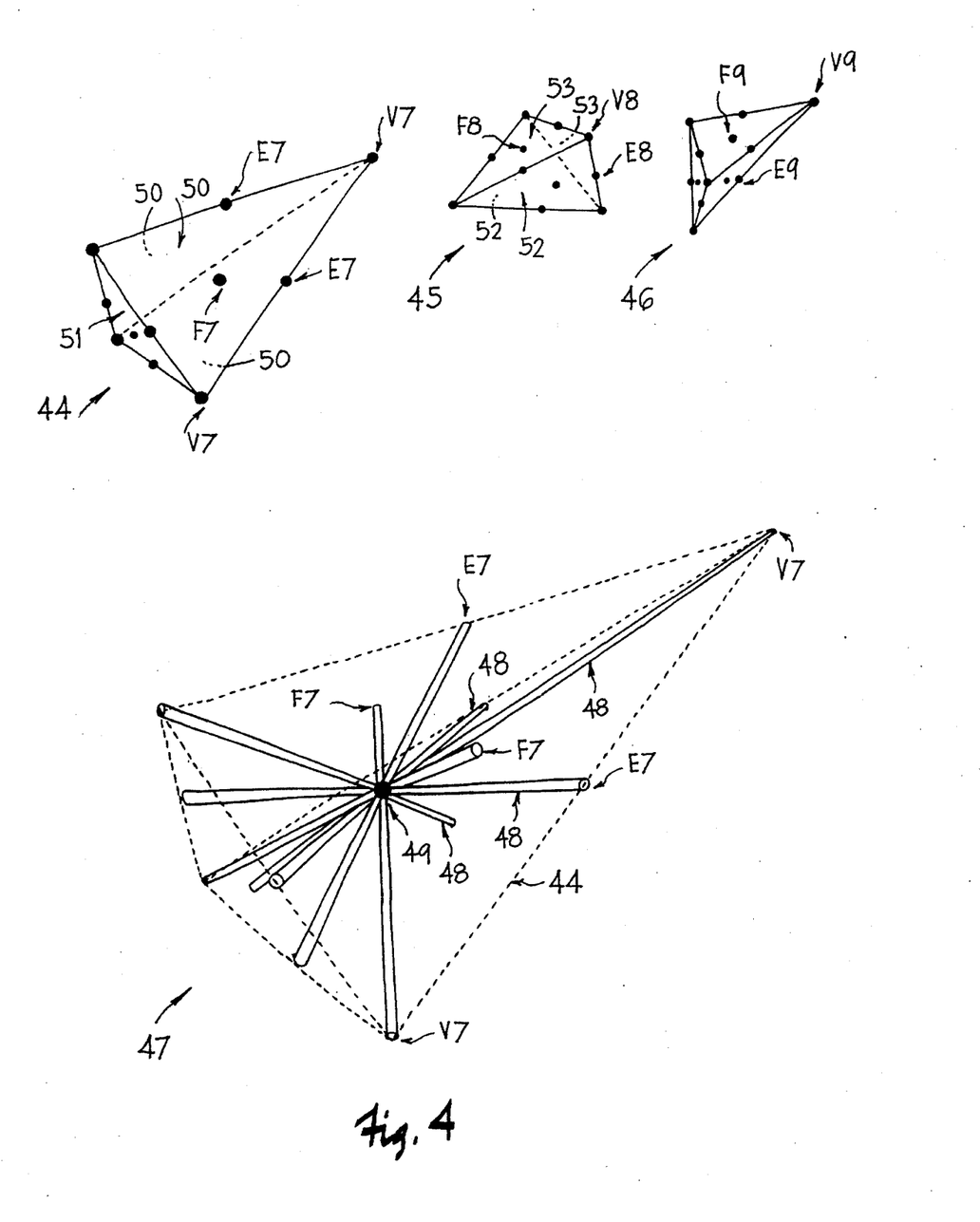
FIG. 4 shows non-regular tetrahedra and a derivative 14-strut (7-directional) node-star.

FIG. 4 shows non-regular tetrahedra 44, 45 and 46 with their vertex points marked V7, V8 and V9, respectively, their edge points marked E7, E8 and E9, respectively, and their face points marked F7, F8 and F9, respectively. The tetrahedron 44 is composed of three isoceles triangles 50 and one equilateral triangle 51. The tetrahedron 45 has two pairs of isoceles triangular faces 52 and 53. The tetrahedron 46 is composed of four asymmetric faces. The node-star 47 is based on the non-regular tetrahedron 44 and is obtained by joining the vertex-, edge- and face-points V7, E7 and F7 to the nodal center 49 using struts 48.

Figure 5:
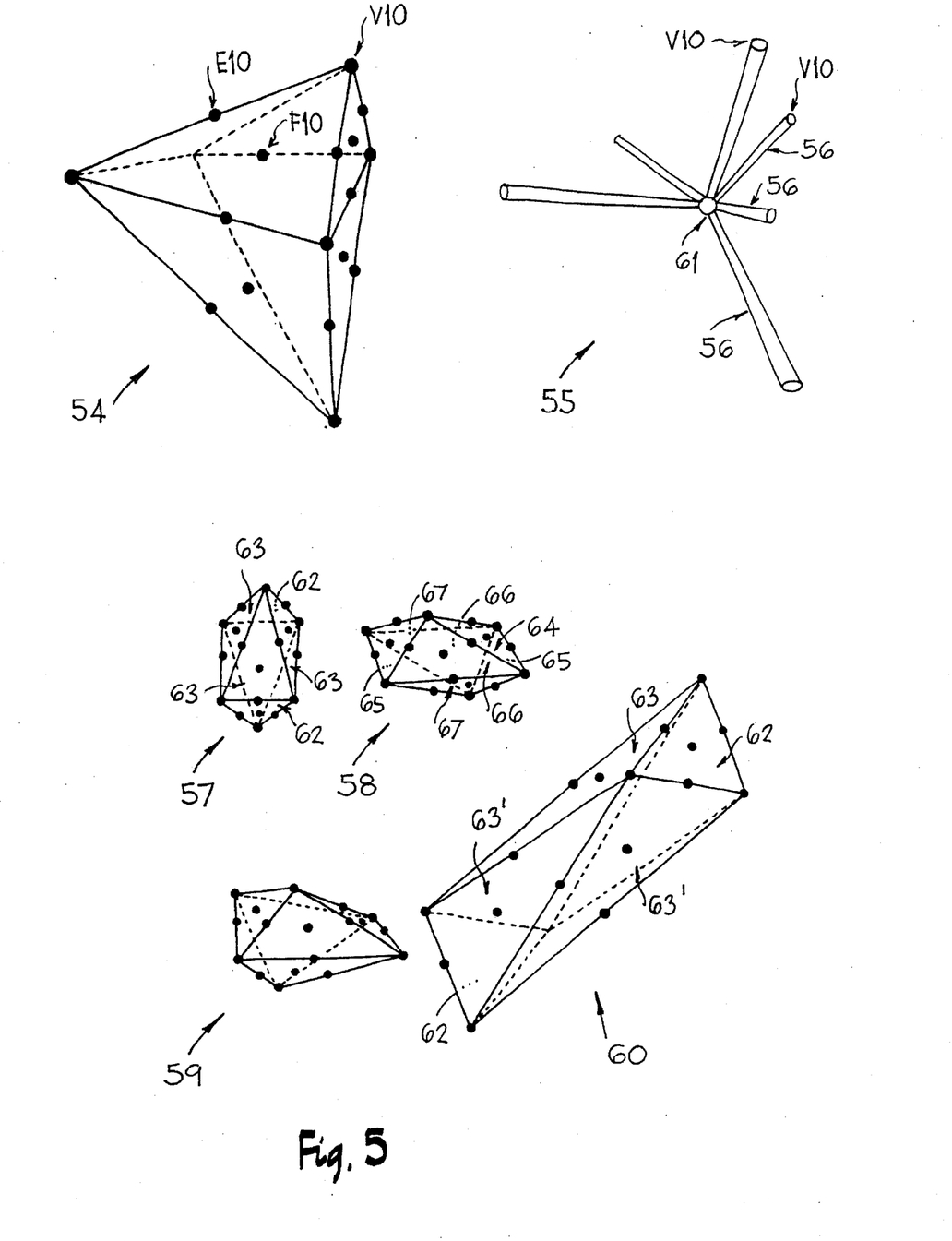
FIG. 5 shows non-regular octahedra and and associated sub node-star with six strut directions.

FIG. 5 shows non-regular octahedra. The octahedron 55 composed of asymmetric triangular faces, is shown with all its vertex points, edge-points and face points marked as V10, E10 and F10, respectively. The node-star 55 is derived from 54 by joining the central node 61 to the six vertex points V10 with struts 56. The non-regular octahedra 57 through 60 show other types of octahedra. In 57, the three-fold axis of symmetry is retained; faces 62 on top and bottom are equilateral triangles, and the remaining six faces joining these two are isoceles triangles. The octahedron 58 is composed of four different faces 64–67, the octahedron 59 is composed of asymmetric triangles, and the octahedron 60 is an elongated version of 57 and composed of faces 62 and 63', where 63' is an isoceles triangle analogous to 63. In all four cases, the vertex-, edge- and face-points are marked. Node-stars can be derived from these by joined the marked points to the center of the respective octahedra.

Figure 6:
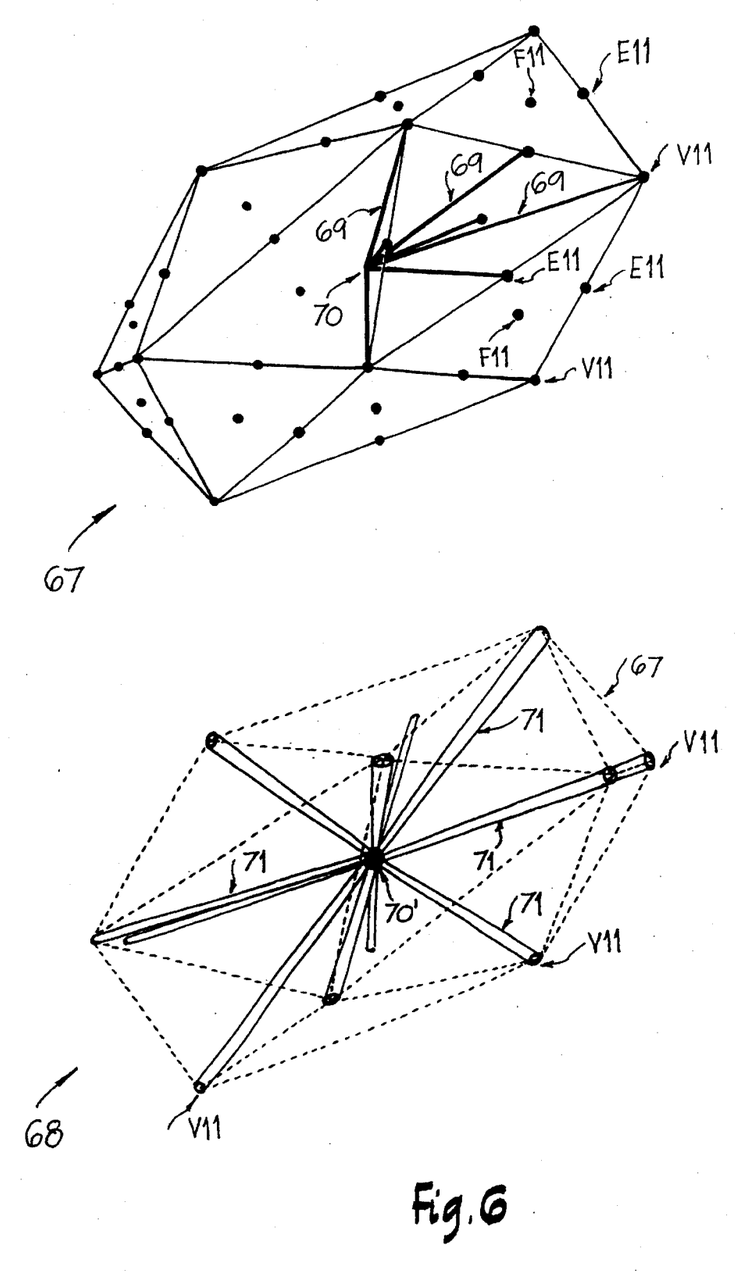
FIG. 6 shows on example of a non-regular icosahedron as a basis for a 62-strut (31-directional) space frame system. An associated node-star with 12-struts is shown.

FIG. 6 shows one example of a non-regular icosahedron 67 composed of twenty non-regular triangles meeting five at a vertex, just the way a regular icosahedron does. It be visualized by elongating or tilting the regular icosahedron, and other "deformed" icosahedra can be similarly derived. The vertex-, edge- and face-points are marked V11, E11 and F11, respectively, and some of the points are joined by radial lines 69 to the center 70. The node-star 68 is based on 67 and is shown with radial struts 71 joining the central node 70' to the twelve vertex-points V11. Note that the non-regular icosahedron 67 generates 62 radial lines which are analogous to the 31-zone system of Baer, but here the geometry (i.e. lengths and angles) are different though the topology (connectedness) is the same. The full node-star 67 will generate configurations which are topologically identical to all configurations which can be generated from the Baer system, but the precise geometry of these new space frame configurations will be differ in lengths and angles.

Figure 7:
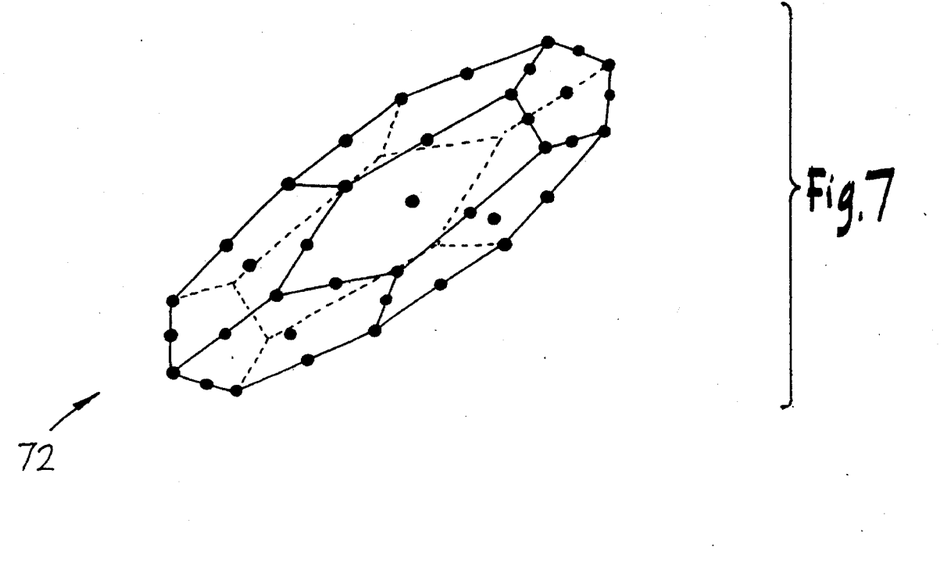
FIG. 7 shows a non-regular dodecahedron which can be used as a basis for another non-regular 31-directional space frame system.

FIG. 7 shows an elongated pentagonal dodecahedron 72, topologically identicakl to the regular dodecahedron, but there the ten of the twelve faces are non-regular. The twelve face-points, the twenty vertex-points and the thirty edge-points are marked. Joining these points to the center provides a 62-directional node. This gives another non-regular variation of the 31-zone system of Baer and can similarly be used to build space frame configurations analogous to those possible from regular dodecahedral nodes. The implications for quasi-crystalline non-periodic architectural configurations are obvious by analogy.

Figure 8:
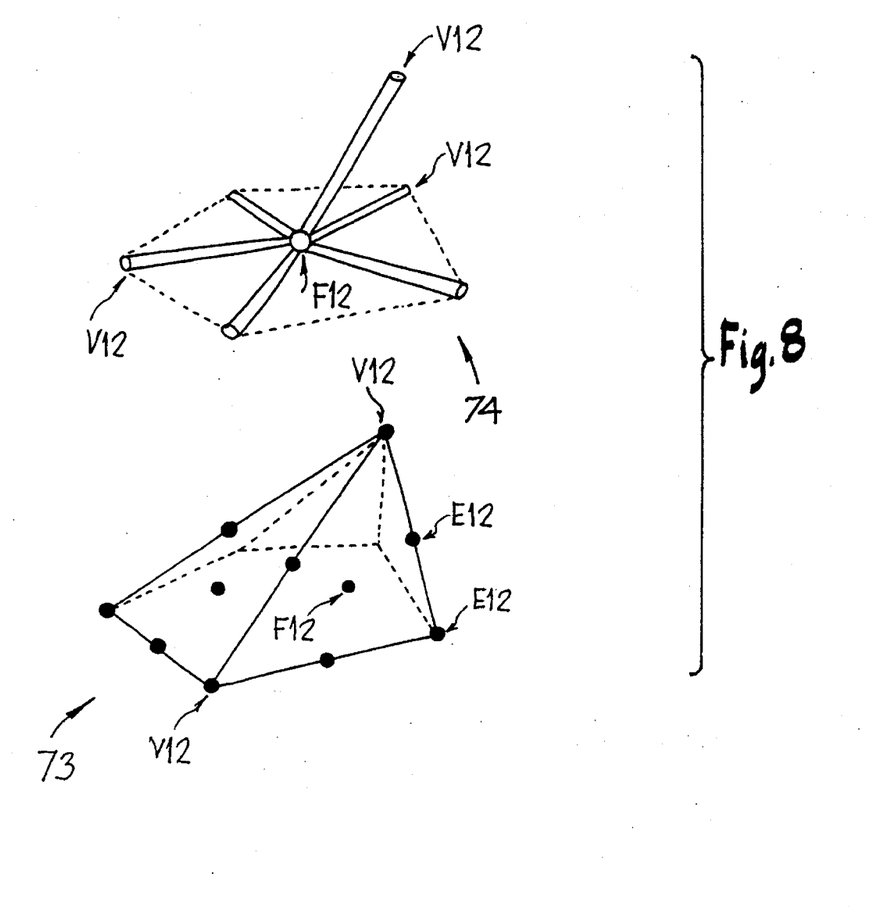
FIG. 8 shows a non-regular inclined pyramid as a basis another non-regular space frame building system. A derivative 6-directional node-star is shown alongside.

FIG. 8 shows a non-regular inclined pentagonal pyramid 73 proposed of vertex-points V12, edge-points E12 and face-points F12. A special type of 6-directional non-regular node-star 74 is derived from 73 by joining the bottom pentagonal face-point F12 to the six vertex-points V12. This node can be used to construct periodic and non-periodic layered configurations.

Figure 9:
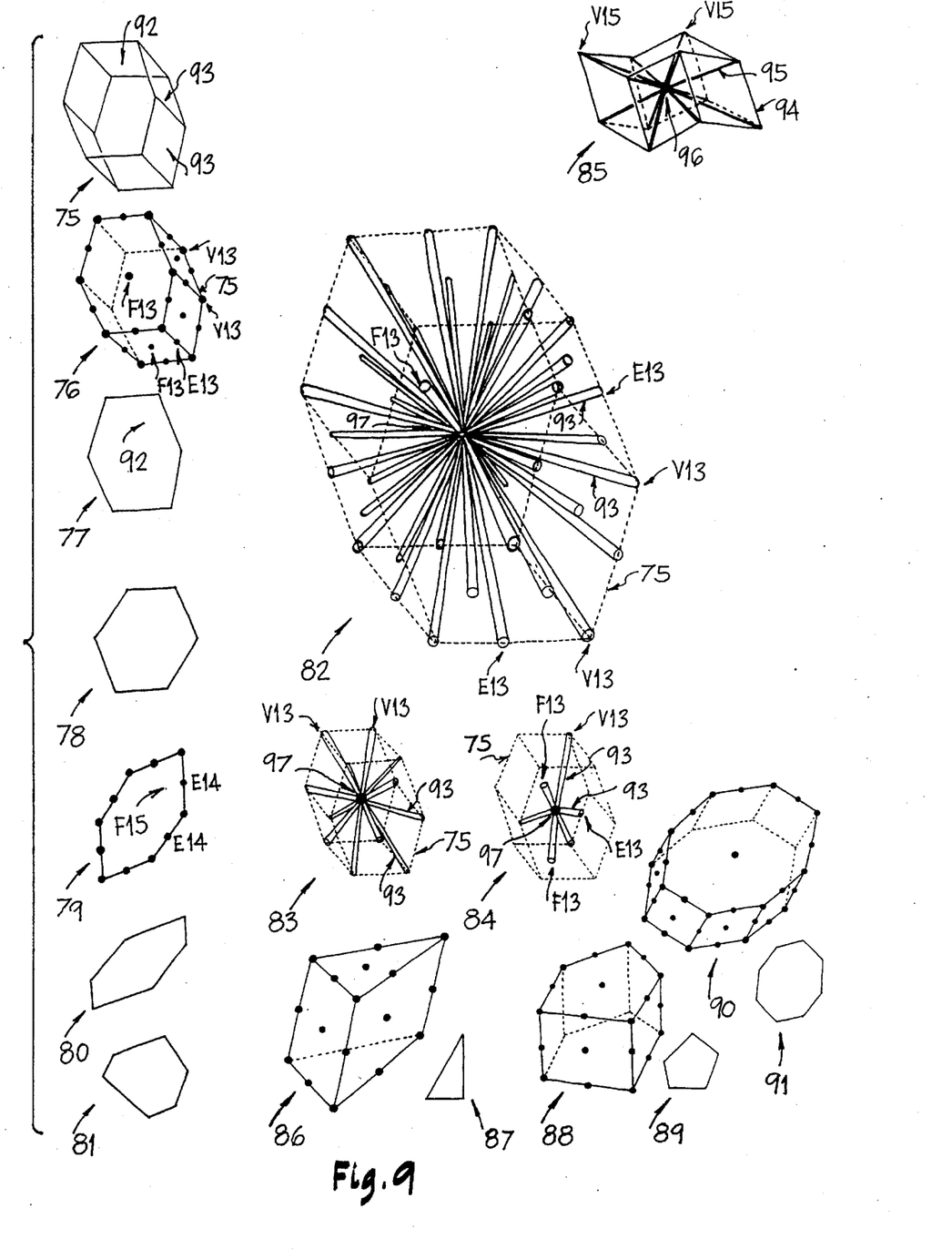
FIG. 9 shows non-regular prisms as generators of node-stars. An example of a 26-strut (13-directional) node-star, based on a hexagonal prism, is shown as a basis for another non-regular space frame building system. Additional sub node-stars with 6 directions are also shown.

FIG. 9 shows various non-regular prisms and derivative node-stars. The hexagonal prism 75 is composed of non-regular hexagonal top and bottom faces 92 connected by square faces 93. In 76, the prism 75 is shown with its vertex-points V13, edge-points E13 and face-points F13. The top plan view 77 shows the hexagon 92 with its true angles which depart from the 120° of a regular hexagon, though it still retains a mirror symmetry. The hexagon 79 is a variant, shown with points marked; note that the edge-points E14 are not marked at mid-points and the face point F14 is also no in the middle. The face point F15 suggests the possibility of locating two points on the face of a polyehdron. The hexagon 80 has two different edge-lengths. It has lost the mirror-plane but has retained the 2-fold symmetry. The hexagon 81 has lost complete symmetry, and has unequal angles and edges.

The node-star 82 is based on the prism 75 and the radial struts 93 join the node 97 placed at the center to the points V13, E13 and F13 already identified earlier in 76. The node-star 83 is a subset of 82 and joins the central node 97 to the vertices V13 with struts 93, The node-star 84 joins the center 97 to a combination of vertex-, edge- and face-points with struts 93. The node-star 85 is based on a saddle hexagonal prism and is shown with lines 95 joining the center 96 to the vertices V15.

Illustrations 86 through 91 show three different non-regular prisms 86, 88 and 90. The triangular prism 86 has the top and bottom faces composed of asymmetric right-angled triangles 87, the pentagonal prism 88 is composed of top and bottom non-regular pentagons 89 with unequal face angles and edges, the octagonal prism 90 is composed of top and bottom octagons 91 having equal edges and unequal angles. In the three cases, the vertex-, edge- and face-points are marked to show possible directions of struts radiating from a node placed at the center.

Figure 10:
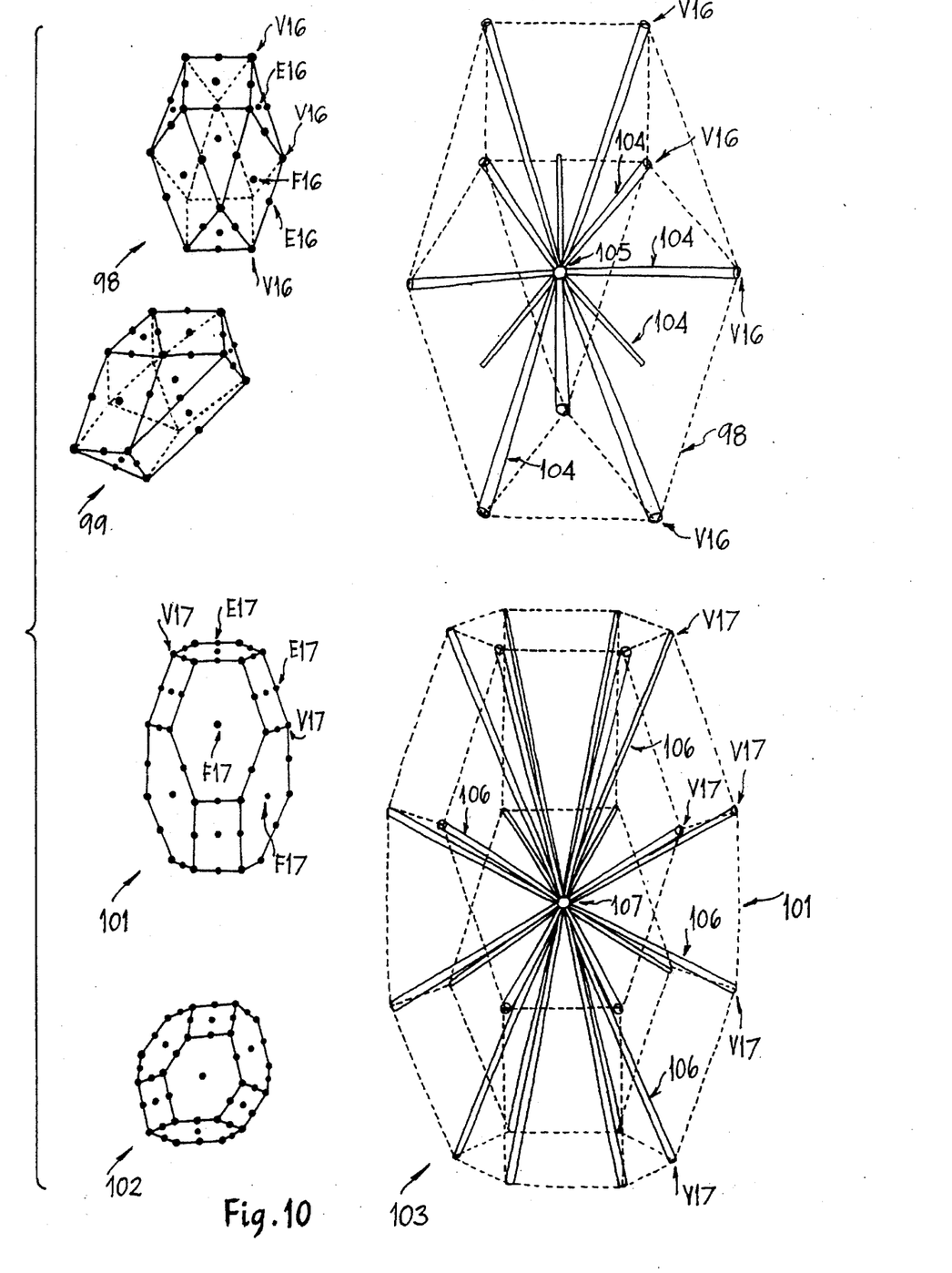
FIG. 10 shows two examples of non-regular versions of Archimedean polyhedra as generators of non-regular space frame building systems. Examples include 12-strut (6-directional) and 24-strut (12-directional) node-stars derived from a cuboctahedron and truncated octahedron, respectively.

FIG. 10 shows two examples of non-regular analogs of the semi-regular Archimedean polyhedra. Other examples can be similarly derived. The elongated cuboctahedron 98 is shown with its vertex-, edge- and face-points marked as V16, E16 and F16, respectively. The cuboctahedron 99 is asymmetric. The node-star 100 is derived from 98 and is obtained by joining the center to the twelve vertex-points V16. It is shown with the twelve struts 104 radiating from the center 105. Additional strut directions are possible from the edge-points and face-points. The elongated truncated octahedron 101 has a three-fold axis of symmetry along its vertical axis. Its vertex-, edge- and face-points are marked as V17, E17 and F17, respectively. 102 is an asymmetric variant, also shown with its various points on the surface marked. The node-star 103 is based on 101 and is obtained by joining the struts 106 to the central node 107. The struts radiate to the vertex-points V17, and additional strut directions can be similarly added.

Various non-regular polyhedra have been shown and a technique for deriving node-stars has been shown. The the node-stars are an assembly of a single node at the center from which numerous struts radiate. Suitable mechanical and other attachments, coupling devices, fasteners, interlocking mechanisms, screws, pins, etc. can be used to secure the connection between the node and struts. The nodes can be suitably designed as spheres, ellipsoids, non-regular polyhedra, etc. The nodes can be cast in one or more pieces, can be solid or hollow, can be manufactured in parts and assembled. The struts could be solid, hollow, have a polygonal section or be tapered.

The same nodes can produce an infinite variety of configurations, and can be assembled or disassembled into other configurations. The same nodes, coupled with struts can produce periodic, non-periodic and irregular or random arrangements. The non-periodic arrangements could be rule-based, oor procedure-based, whereby a construction procedure enables the systematic generation of the non-periodic configuration. The configurations could be single-layered as in screens, double-layered as in roofs, triple or multi-layered as in 3-dimensional space frames for habitats. The configurations could also be multi-directional, without any layers.

The non-regular space frame systems described herein can be used to generate a large variety of space configurations. Besides the various non-regular polyhedra, zonohedra, space-fillings of parallelopipeds, rhombohedra and zonohedra are possible. n-dimensional space frames are also possible. Of particular interest are hyper-cubes or n-dimensional cubes, hyper-cubic or n-dimensional cubic lattices, various 4-dimensional and n-dimensional polytopes, where n is any number greater than three. The space frames could be stabilized with triangulation, cables or membranes.

The node-stars could be converted into "nodeless" space frame systems where the struts radiate in the same manner from the node center, but bypass the center or connect to adjacent struts. The node-star concept can be easily converted into a building system using the structural plate concept by inserting plates in the polygonal areas defined by the struts. In pure plate action configurations, the struts can be removed and the plates attached to one another.

The full node-stars could be used, or only sub-stars could be used as less complex nodes for simpler construction kits. Infinite variants of each non-regular polyhedron could be used to derive new classes of nodes. This way the inventory of building systems can be continually updated with newer configurations.

While only selected examples and features of the invention have been described, numerous variations can be developed without departing from the scope of the invention.

What is claimed is:

1. A space frame building system comprising:
   a plurality of nodes coupled by a plurality of struts wherein said nodes are based on a non-regular polyhedron comprising an interior and a surface, said surface including vertices, edges and faces, wherein at least one of said faces is a non-regular polygon having at least two different angles between said edges and wherein said non-regular polyhedron lacks the symmetry of regular polyhedra and regular prisms composed of only regular polygons, wherein
   said nodes are derived from the directions of lines obtained by joining a point lying in the interior of said polyhedron to points lying on said surface of said polyhedron and wherein said directions of lines determine the directions of said struts,
   and wherein said nodes are coupled to said struts by attachment means to make a variety of spatial configurations.

2. A building system according to claim 1, wherein the said spatial configurations are periodic.

3. A building system according to claim 1, wherein the said spatial configurations are non-periodic or irregular.

4. A building system according to claim 1, wherein the said spatial configurations comprise n-dimensional space frames projected into three dimensions and selected from the group comprising:
   an n-dimensional hyper-cubic lattice,
   an n-dimensional polytope, where n is greater than 3.

5. A building system according to claim 1, wherein said points lying on said surface of said polyhedron are selected from any combination of said vertices of said polyhedron.

6. A building system according to claim 1, wherein said points lying on said surface of said polyhedron are selected from points lying on any combination of said edges of said polyhedron.

7. A building system according to claim 1, wherein said points lying on said surface of said polyhedron are selected from points lying on any combination of said faces of said polyhedron.

8. A building system according to claim 1, wherein said points lying on said surface of said polyhedron are selected from points lying on any combination of said vertices, said edges and said faces of said polyhedron.

9. A building system according to claim 1, wherein said faces of said polyhedron are saddle-shaped polygons.

10. A building system according to claim 1, wherein said non-regular polyhedron is a parallelopiped composed of three pairs of parallel parallelogram faces at least two different edge lengths wherein at least one face angle of said parallelogram is not a right angle.

11. A building system according to claim 1, wherein said non-regular polyhedron is a non-regular tetrahedron composed of four non-regular triangular faces and having at least two different edge lengths.

12. A building system according to claim 1, wherein said non-regular polyhedron is a non-regular octahedron composed of eight non-regular triangular faces and having at least two different edge lengths.

13. A building system according to claim 1, wherein said non-regular polyhedron is a non-regular icosahedron composed of twenty non-regular triangular faces and having at least two different edge lengths.

14. A building system according to claim 1, wherein said non-regular polyhedron is a non-regular dodecahedron composed of twelve pentagonal faces comprising at least one non-regular pentagon.

15. A building system according to claim 1, wherein said a non-regular polyhedron is a non-regular polyhedron composed of non-regular polygonal faces and topologically identical to the thirteen semi-regular Archimedean polyhedra.

16. A building system according to claim 1, wherein said non-regular polyhedron is a non-regular prism composed of a top and bottom non-regular polygonal face having p sides, said faces having at least two different edge lengths and face angles and joined by p parallelograms.

17. A building system according to claim 1, wherein said a non-regular polyhedron is a non-regular pyramid composed of non-regular polygonal base having p sides, said polygonal base having at least two different edge lengths and face angles.

* * * * *